US011128584B2

(12) United States Patent
Kim et al.

(10) Patent No.: US 11,128,584 B2
(45) Date of Patent: Sep. 21, 2021

(54) METHODS, SYSTEMS AND COMPUTER READABLE MEDIUMS FOR PROVIDING A RICH MENU FOR INSTANT MESSAGING SERVICES

(71) Applicant: LINE Corporation, Tokyo (JP)

(72) Inventors: Mi Seon Kim, Seongnam-si (KR); Do Hun Im, Seongnam-si (KR); Young Su Ko, Seongnam-si (KR); Yusuke Ota, Seongnam-si (KR)

(73) Assignee: LINE CORPORATION, Tokyo (JP)

( * ) Notice: Subject to any disclaimer, the term of this patent is extended or adjusted under 35 U.S.C. 154(b) by 97 days.

(21) Appl. No.: 16/216,285

(22) Filed: Dec. 11, 2018

(65) Prior Publication Data

US 2019/0116143 A1 Apr. 18, 2019

Related U.S. Application Data

(63) Continuation of application No. 14/839,611, filed on Aug. 28, 2015, now Pat. No. 10,187,335.

(30) Foreign Application Priority Data

Feb. 11, 2015 (KR) ........................ 10-2015-0021144

(51) Int. Cl.
*H04L 12/58* (2006.01)
*G06T 11/60* (2006.01)
(Continued)

(52) U.S. Cl.
CPC ............ *H04L 51/046* (2013.01); *G06T 11/60* (2013.01); *H04L 12/1813* (2013.01);
(Continued)

(58) Field of Classification Search
CPC ... H04L 51/046; H04L 12/1813; H04L 67/02; H04L 51/18; G06T 11/60; G06T 2200/24
See application file for complete search history.

(56) References Cited

U.S. PATENT DOCUMENTS

| 8,108,459 B1 | 1/2012 | Hoffman et al. |
| 8,380,803 B1 | 2/2013 | Stibel et al. |

(Continued)

FOREIGN PATENT DOCUMENTS

| CN | 1556631 A | 12/2004 |
| CN | 103475571 A | 12/2013 |

(Continued)

OTHER PUBLICATIONS

International Search Report dated May 30, 2016 corresponding to PCT patent Application No. PCT/KR2016/000386.

(Continued)

*Primary Examiner* — Tadesse Hailu
(74) *Attorney, Agent, or Firm* — Harness, Dickey & Pierce, P.L.C.

(57) ABSTRACT

Disclosed are a system, method, device, and/or non-transitory computer readable medium for providing an instant messaging service implemented with a computer. The method includes receiving a request on establishing a conversation interface with an official account registered at the instant messaging service from a client, providing a rich menu user interface associated with the official account on a portion of the conversation interface when the client establishes the conversation interface in response to the request, receiving a selection on a display item included in the rich menu from the client, identifying content associated with the selected display item by a manager of the official account, and providing the identified content to the client through the conversation interface.

21 Claims, 14 Drawing Sheets

(51) Int. Cl.
  *H04L 29/08* (2006.01)
  *H04L 12/18* (2006.01)
(52) U.S. Cl.
  CPC .......... *H04L 67/02* (2013.01); *G06T 2200/24* (2013.01); *H04L 51/18* (2013.01)

(56) References Cited

U.S. PATENT DOCUMENTS

| | | | |
|---|---|---|---|
| 9,280,511 | B1* | 3/2016 | Herold .................... G06F 21/60 |
| 9,300,787 | B1 | 3/2016 | Khameneh |
| 2004/0128353 | A1 | 7/2004 | Goodman et al. |
| 2005/0204309 | A1 | 9/2005 | Szeto |
| 2007/0174389 | A1* | 7/2007 | Armstrong ............ G06F 3/0482 709/204 |
| 2010/0123724 | A1* | 5/2010 | Moore ................ H04M 1/7243 345/473 |
| 2010/0205100 | A1 | 8/2010 | Hurley et al. |
| 2010/0306638 | A1 | 12/2010 | Oleksy et al. |
| 2012/0005285 | A1 | 1/2012 | Lin |
| 2012/0222056 | A1 | 8/2012 | Donoghue et al. |
| 2013/0012271 | A1 | 1/2013 | Chi et al. |
| 2013/0144961 | A1 | 6/2013 | Park et al. |
| 2013/0166275 | A1 | 6/2013 | Yang et al. |
| 2013/0339141 | A1 | 12/2013 | Stibel et al. |
| 2014/0059647 | A1 | 2/2014 | Immonen et al. |
| 2014/0068467 | A1* | 3/2014 | Van ......................... H04L 51/04 715/758 |
| 2014/0134969 | A1 | 5/2014 | Jin et al. |
| 2014/0173644 | A1* | 6/2014 | Ball .................... H04N 21/4826 725/14 |
| 2014/0173648 | A1 | 6/2014 | Ball et al. |
| 2014/0240440 | A1* | 8/2014 | Seo .................... H04M 1/7253 348/14.03 |
| 2014/0324989 | A1* | 10/2014 | Zhang .................... H04L 51/04 709/206 |
| 2014/0331143 | A1* | 11/2014 | Herold .................... H04L 51/10 715/738 |
| 2014/0359018 | A1 | 12/2014 | Sun |
| 2014/0379823 | A1 | 12/2014 | Wilsher et al. |
| 2015/0263997 | A1 | 9/2015 | Abate |
| 2015/0365361 | A1 | 12/2015 | Tomlinson et al. |
| 2016/0050177 | A1* | 2/2016 | Cue ....................... G06F 16/273 709/206 |
| 2016/0127287 | A1 | 5/2016 | Oh et al. |
| 2016/0212230 | A1 | 7/2016 | Schneider et al. |
| 2016/0294748 | A1 | 10/2016 | Yang et al. |
| 2016/0301638 | A1* | 10/2016 | Chen ....................... H04L 51/32 |
| 2017/0357521 | A1* | 12/2017 | Paek ................... G06F 3/04886 |

FOREIGN PATENT DOCUMENTS

| | | |
|---|---|---|
| CN | 103918290 A | 7/2014 |
| KR | 2002-0074303 A | 9/2002 |
| KR | 10-2010-0101718 A | 9/2010 |
| KR | 10-0996682 B1 | 11/2010 |
| KR | 10-2013-0039231 A | 4/2013 |
| KR | 2013-0087392 A | 8/2013 |
| KR | 10-2014-0107849 A | 9/2014 |

OTHER PUBLICATIONS

Korean Office Action dated Oct. 21, 2015 issued in corresponding Korean Application No. 10-2015-0021144.

Japanese Office Action dated Oct. 15, 2019 for corresponding Japanese Application No. 2017-541970.

"Communication that includes non-character information as plus a" Tamami Nakamura, PC Japan, Softbank Publishing Co., Ltd. Aug. 1, 2000, vol. 5, No. 8, p. 134-138.

"The basics of genuine software are parfect" Hironori Oguchi, Mac People Basic Apr. 2010, ASCII Media Works Inc. Japan, Feb. 26, 2010, vol. 16, No. 4, p. 94-123.

Chinese Office Action dated Dec. 19, 2019 for corresponding Chinese Application No. 201680009369.6.

* cited by examiner

Rich menu
Display rich menu at chat room to guide set keyword response message or show important information

| | | |
|---|---|---|
| 410 — Yes/No | ○ Non-Display   ⊙ Display | |
| 420 — Duration | [YYYY-MM-DD 🗓] [0 ▽]:[0 ▽] [0 ▽] ~ [YYYY-MM-DD 🗓] [0 ▽]:[0 ▽] [0 ▽] | |
| 430 — template selection | ⊙ image   ○ test + icon | |

(1) design guide >   (2) design guide >   (3) design guide >

(4) design guide >   (5) design guide >   (6) design guide >

⊙ (7) design guide >

Set menu contents

440 — [📷] [Upload]   design guide>

450 — 
| edit | set | set |
|------|-----|-----|
| set  | set | set |

Action  ⊙ keyword  ○ URL  ○ Do not set

[Preview(menu)]  [Save]

FIG. 5

Rich menu
Display rich menu at chat room to guide set keyword response message or show important information

| Yes/No | ○ Non-Display    ⊙ Display |
|---|---|
| Duration | YYYY-MM-DD 📅 [0 ▽]:[0 ▽]:[0 ▽] ~ YYYY-MM-DD 📅 [0 ▽]:[0 ▽]:[0 ▽] |
| template selection | ○ image    ⊙ test + icon <br> ○ icon + text1    ⊙ icon + text2 |

530

Set menu contents

| edit | set | set |
|---|---|---|
| set | set | set |

550

Icon: 📢 ▽

Label: [_____] 0/12

Action: ⊙ keyword   ○ URL
[ select ]

( Preview(menu) ) [ Save ]

METHODS, SYSTEMS AND COMPUTER READABLE MEDIUMS FOR PROVIDING A RICH MENU FOR INSTANT MESSAGING SERVICES

CROSS-REFERENCE TO RELATED APPLICATIONS

This is a continuation application of U.S. non-provisional application Ser. No. 14/839,611, filed on Aug. 28, 2015, which claims the benefit of priority under 35 U.S.C. § 119 to Korean Patent Application No. 10-2015-0021144 filed on Feb. 11, 2015, in the Korean Intellectual Property Office (KIPO), the entire contents of each of which are hereby incorporated by reference in its entirety.

BACKGROUND

Example embodiments of the inventive concepts described herein relate to technology for providing content associated with an official account through an instant messaging service.

As a communication tool, an instant messenger may be software capable of sending and receiving a message or data in real time and may allow a user to register a conversation partner at a messenger and to exchange a message with a conversation partner of a conversation partner list in real time.

The messenger function may be widely used at a mobile environment of a mobile communication terminal as well as at a personal computer. For example, mobile messenger service system and method of a portable terminal using a wireless communication network to allow a messenger service to be provided between mobile messengers installed on the portable terminals.

SUMMARY

Example embodiments of the inventive concepts provide methods, systems, devices, and/or computer readable mediums, capable of allowing an official account manager to use a portion of a menu displayed on an official account interface.

Furthermore, example embodiments of the inventive concepts provide methods, systems, devices, and/or computer readable mediums, capable of providing a rich menu associated with an official account through an official account interface and providing content matched with a corresponding menu in selecting the rich menu.

One aspect of example embodiments of the inventive concepts are directed to provide a method for providing an instant messaging service implemented with a computer. The method includes receiving a request to establish a conversation interface with an official account registered at the instant messaging service from a client, providing a rich menu user interface associated with the official account on a portion of the conversation interface when the client establishes the conversation interface in response to the request, the rich menu user interface including at least one display item, receiving a selection on the at least one display item included in the rich menu user interface from the client, identifying content associated with the selected display item by a manager of the official account, and providing the identified content associated with the selected display item to the client through the conversation interface.

According to at least one example embodiment, the providing of the identified content may include transmitting a desired keyword through the conversation interface to the client when the desired keyword is associated with the content at the selected display item.

According to at least one example embodiment, the providing of the identified content may include transmitting a uniform resource locator (URL) including information associated with a desired web page through the conversation interface when the URL is associated with the content at the selected display item.

According to at least one example embodiment, the providing of the identified content may include transmitting an action code through the conversation interface when the action code is associated with the content at the display item, the action code including computer readable instructions that call a desired program on the client.

According to at least one example embodiment, the method may include providing a rich menu construction tool for constructing the rich menu with respect to the manager, and connecting the content to each of the at least one display items included in the rich menu through the rich menu tool.

According to at least one example embodiment, the rich menu tool may include a template type selection function to select a template type on the rich menu and a content connection function to connect the content to each user interface area included in a template.

According to at least one example embodiment, the rich menu tool may include an image setting function to set an image of the rich menu based on the template type, or a text setting function to set a text and an icon of the rich menu.

According to at least one example embodiment, the rich menu tool may include at least one of a display function to set a display on/off setting of the rich menu or a duration function to set a display duration setting of the rich menu.

According to at least one example embodiment, the content connection function may connect a keyword input or an URL input as the content.

Another aspect of example embodiments of the inventive concepts is directed towards a non-transitory computer-readable medium including computer readable instructions for controlling a computer system to, when executed, provide an instant messaging service method. The method may include receiving a request to establish a conversation interface with an official account registered at the instant messaging service from a client, providing a rich menu user interface associated with the official account on a portion of the conversation interface when the client establishes the conversation interface in response to the request, the rich menu user interface including at least one display item, receiving a selection on the at least one display item included in the rich menu user interface from the client, identifying content associated with the selected display item by a manager of the official account, and providing the identified content associated with the selected display item to the client through the conversation interface.

Another aspect of example embodiments of the inventive concepts directed towards a device for providing an instant messaging service. The device may include a memory having computer readable instructions stored thereon, and at least one processor configured to execute the computer readable instructions to, transmit a request to establish a conversation interface with an official account registered at the instant messaging service, display a rich menu user interface associated with the official account on a portion of the conversation interface upon establishing the conversation interface, the rich menu user interface including at least one display item, receive a selection input related to the at least one display item included in the rich menu user interface, transmit a request to receive content associated with the selected display item, receive the content associated with the selected display item, and display the received content through the conversation interface.

According to at least one example embodiment, the receiving of the content may include displaying the content through the conversation interface by the message when the received content is a desired keyword.

According to at least one example embodiment, the receiving of the content may include executing a web page corresponding to a desired URL when the received content is the desired URL.

According to at least one example embodiment, the receiving of the content may include executing a desired program when the received content includes an action code for calling the desired program.

Still another aspect of example embodiments of the inventive concepts are directed towards provide a system for providing an instant messaging service. The system may include a memory having computer readable instructions stored thereon, and at least one processor configured to execute the computer readable instructions to register a rich menu user interface in connection with an official account through a management tool on the official account by a manager of the official account registered at the instant messaging service, and provide the rich menu user interface linked to the official account on a portion of the conversation interface when a client establishes a conversation interface with the official account.

According to at least one example embodiment, the at least one processor may be configured to receive a selection of a display item included in the rich menu from the client, identify content associated with the selected display item by the manager, and provide the identified content to the client through the conversation interface.

According to at least one example embodiment, the management tool may include a template type selection function to select a template type on the rich menu user interface, and a content connection function to connect the content to each user interface area included in a template.

According to at least one example embodiment, the management tool may include an image setting function to set an image of the rich menu user interface based on the template type, or a text setting function to set a text and an icon of the rich menu user interface.

According to at least one example embodiment, the management tool may include at least one of a display function to set a display on/off setting of the rich menu user interface, or a duration function to set a display duration setting of the rich menu user interface.

According to at least one example embodiment, the content connection function may input a keyword or an URL as the content.

BRIEF DESCRIPTION OF THE FIGURES

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIGS. 4 and 5 are diagrams illustrating an CMS environment for registering a rich menu, according to at least one example embodiment of the inventive concepts;

DETAILED DESCRIPTION

Figure 1:
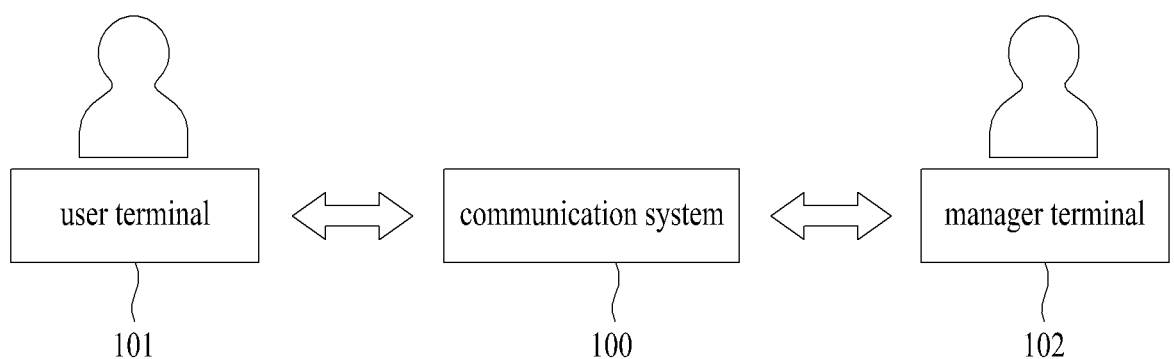
FIG. 1 is a diagram illustrating a communication environment using a messenger, according to at least one example embodiment of the inventive concepts.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein. Example embodiments of the inventive concepts relate to technology for providing content through an instant messaging service, and in particular, to method, system, and/or computer readable medium, capable of providing content associated with a corresponding account through a conversation interface with an account registered at an instant messaging service.

The "official account" described herein may refer to an account that has been officially certified by the instant messaging service as being associated with a person (e.g., a celebrity, a public figure, a politician, etc.) and/or entity, such as a business, company, corporation, organization, service group, advertiser, governmental agency, etc., that provides a variety of information associated with the person and/or entity for example, brand information, enterprise information, artist information, entertainer information, media information, and the like, on a messenger service, software and/or application (hereinafter messenger service). The information may be opened and recommended to all users using the messenger service. Furthermore, the "official account" may additionally refer to an account which a user is able to add as a conversation partner by permitting them to be automatically recommended to a messenger user based on a desired condition and/or desired range of conditions. For example, the "official account" may include an account which is recommended to users satisfying desired demographic conditions such as an age, a sex, geographic residence, occupation, education level, salary level, and the like, an account which is recommended to users who have input authorization codes, accepted invitations, or the like, through various paths (or routes) on an online network (e.g., the Internet, an intranet, a LAN, a WAN, a PAN, a communication network, etc.) or an offline network (e.g., a physical mail network, etc.), or the like.

FIG. 1 is a diagram illustrating a communication environment using a messenger service, according to at least one example embodiment of the inventive concepts. In FIG. 1, there are illustrated a user terminal 101, a manager terminal 102, and a communication system 100. The communication system may refer to a server, a distributed processing network, etc. In FIG. 1, the arrows may mean that data is transmitted and received between components over a communication and/or data network, such as a wired and/or wireless network.

The user terminal 101 and the manager terminal 102 may each include one or more terminal devices capable of installing and executing a service-dedicated application or connecting to a web/mobile site associated with the communication system 100, such as a personal computer (PC), a laptop computer, a smart phone, a tablet, a wearable computer, a PDA, and the like. Here, the manager terminal 102 may refer to a terminal device which is used to manage an official account by an individual or a company (including one or more members) having an official account (e.g., certified account, verified account, etc.) registered at an instant messaging service, as a content provider of providing content to service users through the instant messaging service.

Here, under the control of a web/mobile site or a dedicated software application, e.g., a smart device app, a web applet, a computer program, etc., the user terminal 101 and the manager terminal 102 may perform an overall operation of an instant messaging service including service screen construction and/or generation, data input, data transmission and reception, data storage, and the like.

The communication system 100 may act as a messenger platform which provides an instant messaging service to one or more client terminals. In other words, the communication system 100 may be a system that provides a messenger service allowing data to be exchanged between a messenger account of at least one user terminal 101 and a messenger account of at least one manager terminal 102. In particular, in this example embodiment, the communication system 100 may provide a rich communication function for providing content associated with an official account through a conversation interface with an official account of the manager terminal 102. To this end, the communication system 100 may provide a content management system (CMS) environment which makes it possible to freely construct a menu for rich communication of an official account with respect to an official account manager.

The communication system 100 may be implemented in such a way that it is included in a platform of at least one messenger server (not illustrated) for providing an instant messaging service. However, the scope and spirit of the inventive concepts may not be limited thereto. For example, the communication system 100 may be implemented with a system independent of a messenger server so as to manage an official account in conjunction with the messenger server. At least a portion of components of the communication system 100 may be implemented by applications installed on the user terminal 101 and the manager terminal 102 or may be implemented in such a way that it is included in a platform for providing a service in a client-server environment.

Below, at least one example embodiment on a rich communication function will be described with respect to an official account. However, the scope and spirit of the inventive concepts may not be limited thereto. For example, a rich communication function may be extended to all messenger accounts. For example, even though an account is not an official account, individuals respectively having messenger accounts may construct a rich menu, and a rich communication function may be provided between individuals and/or accounts.

In the case where a rich menu is used as a marketing model such as a promotion or advertisement means and the like, it may be possible to implement a platform for managing registration, display, charging, and the like on the rich menu. The communication system 100 may provide a marketing solution using a rich menu of an official account by including the platform or in conjunction with the platform.

Figure 2:
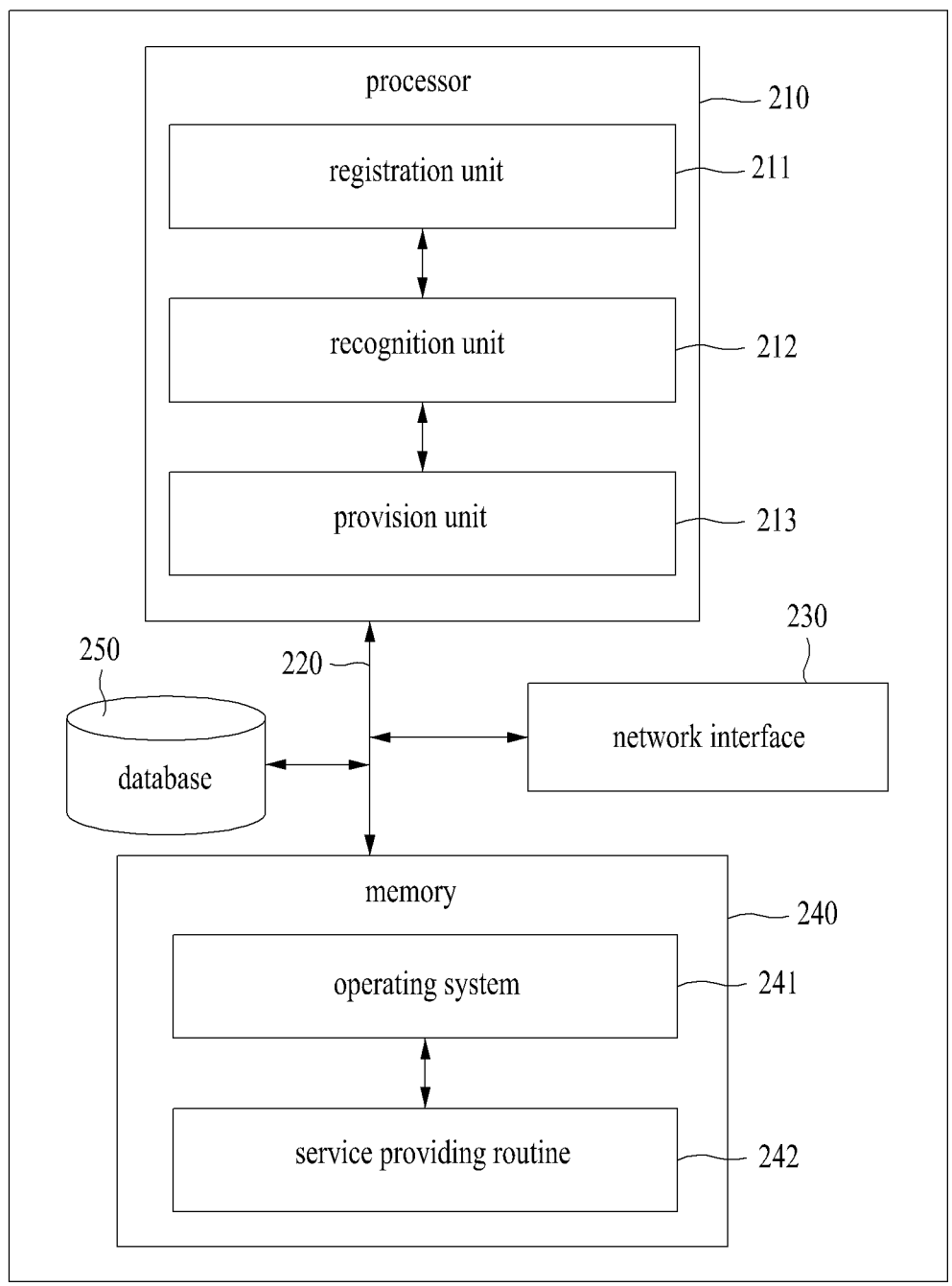
FIG. 2 is a block diagram illustrating an internal configuration of a communication system, according to at least one example embodiment of the inventive concepts.
Figure 3:
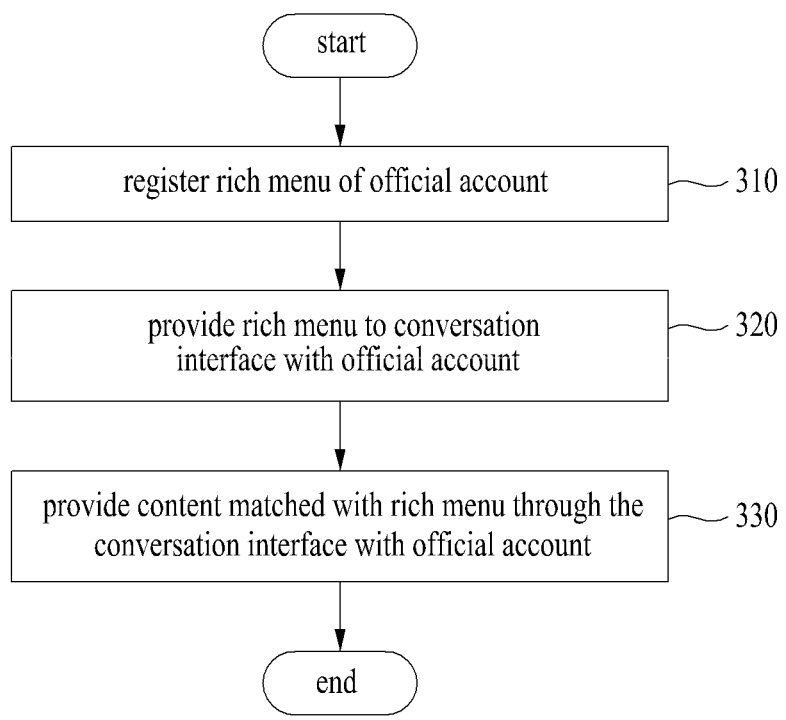
FIG. 3 is a flow chart illustrating a communication method according to at least one example embodiment of the inventive concepts.

FIG. 2 is a block diagram illustrating an internal configuration of a communication system, according to at least one example embodiment of the inventive concepts, and FIG. 3 is a flow chart illustrating a communication method according to at least one example embodiment of the inventive concepts.

A communication system 200 according to at least one example embodiment of the inventive concepts may include one or more computing devices, such as a server, that include at least one processor 210, a bus 220, a network interface 230, a memory 240, and database 250, etc. The memory 240 may include an operating system 241 and a service provision routine 242, etc. The processor 210 may include computer readable instructions for specially programming the processor 210 as a registration unit 211, a recognition unit 212, and/or a provision unit 213. In other example embodiments, the communication system 200 may include a greater or lesser number of components than that shown in FIG. 2. For example, the communication system 200 may include any other components such as a display, a transceiver, and the like.

The memory 240 may be a computer-readable recording medium and may include a random access memory (RAM), a read only memory (ROM), and/or a permanent mass storage device such as a disk drive, or a solid state drive. Stored in the memory 240 is program code for the operating system 241 and the service provision routine 242, as well as the computer readable instructions associated with the registration unit 211, a recognition unit 212, and/or a provision unit 213. Such software components may be loaded from a computer-readable recording medium, which is independent of the memory 240, using drive mechanism (not illustrated). The computer-readable recording medium independent of the memory 240 may include a computer-readable recording medium, such as a floppy drive, a disk drive, a tape drive, a DVD/CD-ROM drive, a memory card, a solid state drive, or the like. In other example embodiments, software components may be loaded onto the memory 240 through the network interface 230, instead of or in addition to the computer-readable record medium.

The bus 220 may enable communication and data transmission to be performed between components of the communication system 200. The bus 220 may be implemented using a high-speed serial bus, a parallel bus, a storage area network (SAN), and/or any other appropriate communication technology.

The network interface 230 may be a computer hardware component for connecting the communication system 200 to a computer network. The network interface 230 may connect the communication system 200 to a computer network through a wired and/or wireless connection.

The database 250 may store and retain all information associated with a rich menu, such as content matched (e.g., associated with and/or related to) with the rich menu of an official account, associated with one or more official accounts, respectively. In FIG. 2, at least one example embodiment of the inventive concepts is exemplified as the database 250 is implemented in the communication system 200. However, the scope and spirit of the inventive concepts may not be limited thereto. For example, the database 250 may be omitted according to a system implementation manner or environment, or the whole or a portion of the database 250 may be implemented with external databases constructed on a separate server, or other communication systems.

The processor 210 may process an instruction of a computer program by performing an arithmetic operation, a logic operation, and an input/output operation of the communication system 200. The memory 240 or the network interface 230 may provide the instruction to the processor 210 through the bus 220. The processor 210 may be configured to execute program code for the registration unit 211, the recognition unit 212, and the provision unit 213. The program code may be stored at a recording device such as the memory 240.

The registration unit 211, the recognition unit 212, and the provision unit 213 may be configured to perform steps 310 to 330 of FIG. 3.

In step 310, the registration unit 211 may provide a CMS environment on an official account to an official account manager, thereby making it possible to register a rich menu associated with the official account based on a setting of the official account manager. The registration unit 211 may provide or generate a user interface tool which allows the official account manager to input a desired label (e.g., an image, animation, video, audio, and/or a text) at a conversation interface of the official account and to provide an environment in which a company associated with the official account freely uses a portion of the conversation interface with the official account. Accordingly, it may be possible to construct and register a rich menu of the official account based on the label received through the tool. The tool for registering the rich menu may provide templates having various sorts and structures with respect to the rich menu, and the rich menu may be constructed in the format of an image, in the format of combination of text and icon, a video, an animation, an audio clip, and/or the like, based on a template selected by the official account manager.

The recognition unit 212 may recognize a user instruction input through an instant messaging service application executing on a client terminal. In particular, the recognition unit 212 may receive, from a client terminal, an instruction (e.g., entering request instruction) for requesting establishing a conversation interface with an official account registered at the instant messaging service, an instruction (e.g., selection instruction) for selecting a rich menu of the official account, and the like.

In step 320, if establishing the conversation interface with the official account is requested from the client terminal, the provision unit 213 may provide and/or generate a rich menu associated with an official account corresponding to the conversation interface with the official account. For example, if a user enters a chat room with an official account, the provision unit 213 may display a rich menu registered by an official account manager at a partial area of a corresponding chat room, for example, a bottom end portion thereof in providing the chat room.

In step 330, if a rich menu is selected by the client terminal, the provision unit 213 may provide a desired (or, alternatively, predetermined) content to the rich menu through a conversation interface with an official account. In other words, in the case where a user selects a display list included in the rich menu, the provision unit 213 may identify content previously matched by an official account manager in connection with the selected display list and may then provide the identified content to a client terminal through the conversation interface with an official account.

In the rich menu, content set by the official account manager may be linked, and the link may be input and set in the format of a keyword reply message and/or a uniform resource locator (URL). A link of the rich menu may make it possible to connect to all web pages having a "HTTP" format and to various formats of content such as a text, a sticker (emoticon), an image, a voice communication, a contact, a video, an audio recording, and the like.

In the keyword example embodiment, if a rich menu is selected at a chat room with an official account, the keyword linked to the rich menu may be transmitted to a client terminal, which corresponds to the same action as if the official account manager directly inputs the keyword. A keyword linked to the rich menu may be displayed at the chat room with the official account as if the client terminal receives the keyword with respect to the selection of the rich menu. In the URL example embodiment, like a web page shortcut action, a web page of an URL linked to the rich menu may be immediately opened according to selection of the rich menu.

As such, a link of the rich menu may include action code which a user intends to appoint to the rich menu and may identify and call an action for providing content through a conversation interface with an official account. Linked to the rich menu are the following types of actions, capable of being provided in connection with a messenger, as well as a keyword transfer or web page shortcut: a promotion link, an advertisement link, a document link, a voice phone call dialing, a video call dialing, a sending of e-mail, a sending of a message, a sharing through a social media service, a memo alert, a note alert, a contact alert, a multimedia (e.g., music, a video, and the like) reproduction, a map view, a file download, and the like. Accordingly, an official account manager may use the rich menu to provide a variety of information or guiding a keyword response message. Furthermore, a link of the rich menu may be used as various communication channels for connecting information for client terminals, such as content, advertisement, contact information, such as telephone number, e-mail, etc., and the like to the rich menu.

Below, there will be described a CMS environment for registering a rich menu of an official account according to at least one example embodiment.

FIG. 4 illustrates a rich menu setting screen 400 according to at least one example embodiment of the inventive concepts.

Referring to FIG. 4, a rich menu setting screen 400 may be a manager tool for setting a rich menu which guides a keyword response message or displays a variety of information through a chat room, and may include a display on/off setting menu 410 for setting a display on/off of a rich menu, a display duration setting menu 420 for setting display duration of the rich menu, and a template selection menu 430 for selecting a template of the rich menu.

The display duration setting menu 420 may include a function for setting a desired duration when a rich menu is displayed at a chat room of an official account and may be configured to set the display duration by the date and/or time, for example in the year/month/day/time format.

The template selection menu 430 may include a function for selecting a template type and may include a function for creating a rich menu by selecting one of an image format ("image creation"), the format of combination of text and icon ("text+icon creation"), a video format ("video creation"), an animation format ("animation creation"), an audio format ("audio creation"), etc. The number of items constituting a rich menu and a structure of the rich menu may be decided according to a template type selected through the template selection menu 430.

As illustrated in FIG. 4, in the case where an official account manager selects "image creation" of the template selection menu 430, image-shaped template types may be presented and a menu for selecting one thereof may be provided; additionally and/or simultaneously, there may be provided an image setting menu 440 for setting an image displayed through a rich menu as an associated menu and a link setting menu 450 for setting a link to the rich menu.

In the case of increasing the rich menu with an image, the image setting menu 440 may include a function for uploading an image. Images may be unified and uploaded regardless of the number of areas in a selected template.

The link setting menu 450 may be a function for setting a link to the rich menu and may include a menu for displaying a template type selected through the template selection menu 430 and setting links on respective areas of a corresponding template. The link may be set by selecting one of a keyword, URL, and/or a no setting. In the case where a template includes a plurality of areas, different links may be respectively set to the areas and may be distinguishable through coordinate values of the areas. An area of a template where an image and a link value are not set may display a "set" state, and an area of the template where an image and a link value are set may display an "edit" state. Displaying of the rich menu may be possible if each area of a template is set with an image and a link value.

As illustrated in FIG. 5, in the case where the official account manager selects "icon+image creation" of a template selection menu 530, template types having a combination of a text and an icon may be presented and a menu for selecting one or more thereof may be provided; additionally and/or simultaneously, there may be provided a link setting menu 550 for setting a link to a template having a combination of a text and an icon as a rich menu.

The link setting menu 550 may be a function for setting a link to the rich menu and may include a menu for displaying a template type selected through the template selection menu 530 and setting links on respective areas of a corresponding template. Here, the link setting menu 550 may include a function for setting icons of areas of a template, a function for setting a label (text), and/or a function for setting a link. The link may be set by selecting one of a keyword and an URL. Likewise, an area of a template where a text and a link value are not set may display a "set" state, and an area of the template where a text and a link value are set may display an "edit" state.

Each of the above-described rich menu setting screens 400 and 500 may provide a preview function for previewing how a rich menu is displayed at a chat room based on a setting state of an official account manager according to at least one example embodiment.

In at least one example embodiment of the inventive concepts, a tool may be provided which allows the official account manager to directly construct and/or generate a partial area displayed at a chat room with an official account as a rich menu, thereby making it possible for the official account manager to use the rich menu as a desired communication channel and to provide a look and feel, such as an advertisement area or a mini homepage, through the rich menu on a chat room.

Below, there will be described a process for providing content through a rich menu of an official account according to at least one example embodiment.

Figure 6:
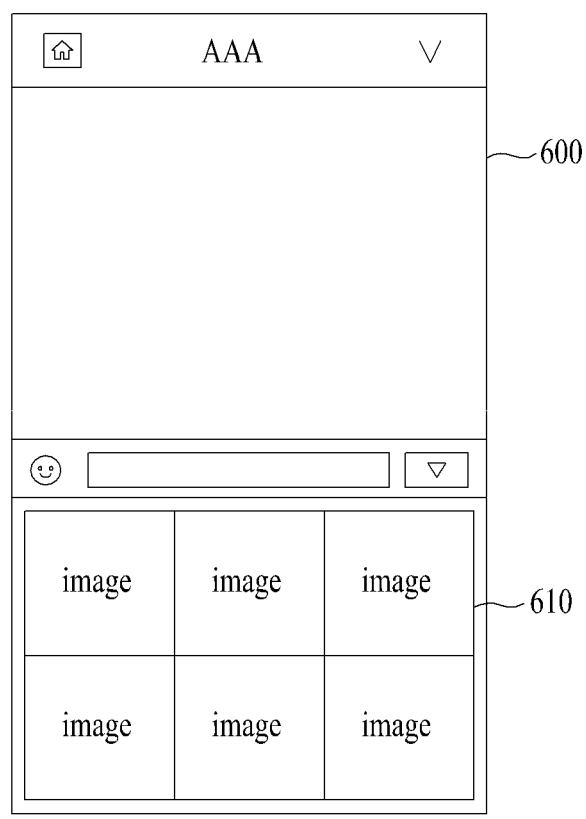
FIGS. 6 to 10 are diagrams illustrating a process for displaying an official account rich menu, according to at least one example embodiment of the inventive concepts.

FIG. 6 illustrates a chat room 600 of an official account named "AAA", according to at least one example embodiment of the inventive concepts.

Referring to FIG. 6, if a user enters a chat room 600 of an official account "AAA", a rich menu 610 set with respect to the official account "AAA" may be displayed on the graphical user interface of the chat room 600, for example at a bottom end portion of the chat room 600.

For example, a rich menu 610 may be displayed in the format of template type which a corresponding official account manager sets at a CMS, and an image set at the CMS may be displayed.

Figure 7:
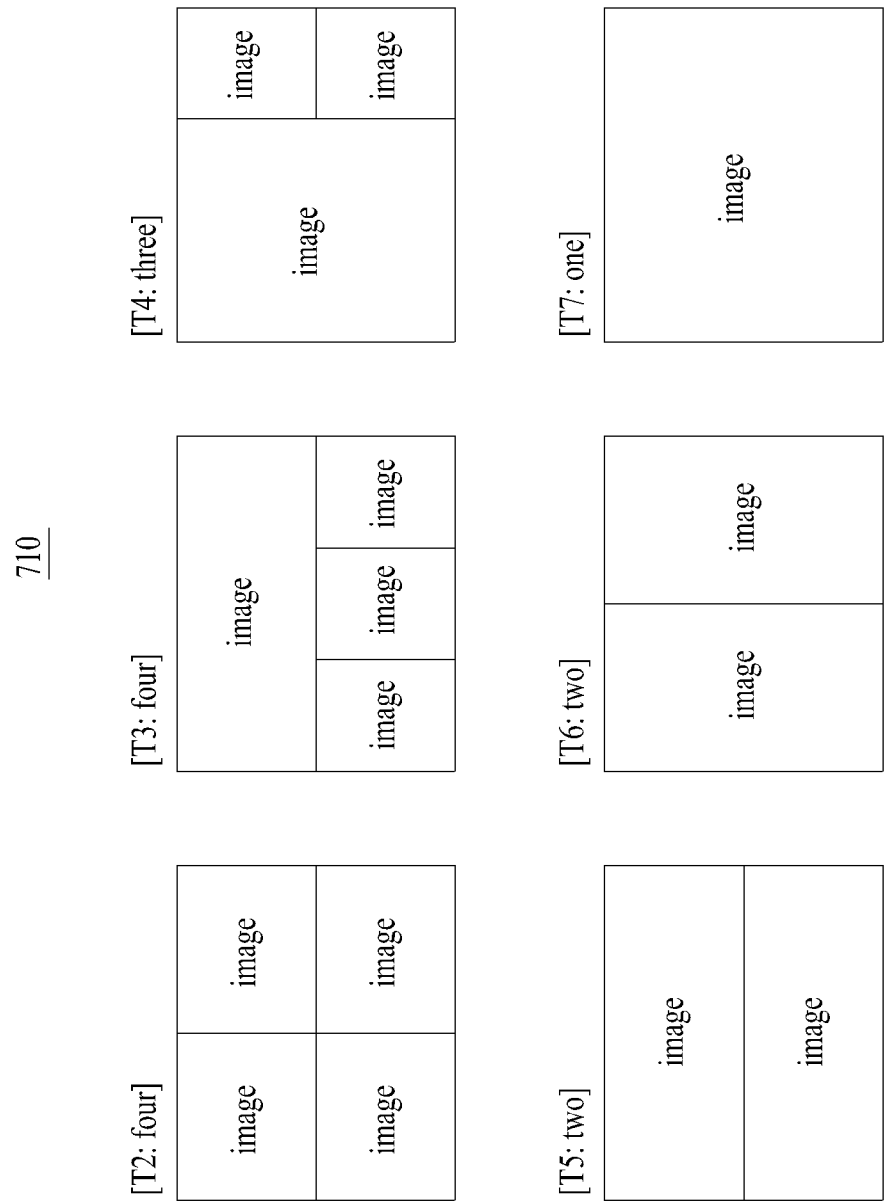

The rich menu 610 may be set with a template including a plurality of areas as illustrated in FIG. 6. Besides, as illustrated in FIG. 7, the rich menu 710 may be constructed and/or generated using a template type in which at least two or more areas are combined in various formats.

In the case where the rich menu 610 is set with an image format, it may be displayed as one sheet of image at a chat room 600, and areas may be identified according to touch and/or screen coordinates.

Figure 8:
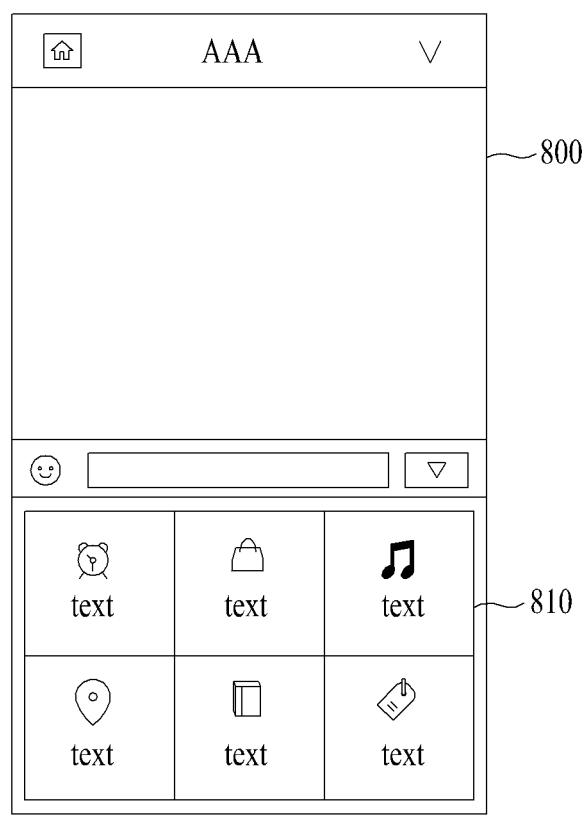

As another example, a rich menu 810 which has the format of combination of a text and an icon may be displayed, as illustrated in FIG. 8, at a chat room 800 of the official account "AAA", based on a template type set at the CMS with respect to an official account "AAA".

Likewise, the rich menu 810 having the format of combination of a text and an icon may be constructed and/or generated to have a structure in which at least two or more areas are variously combined according to a template type.

Figure 9:
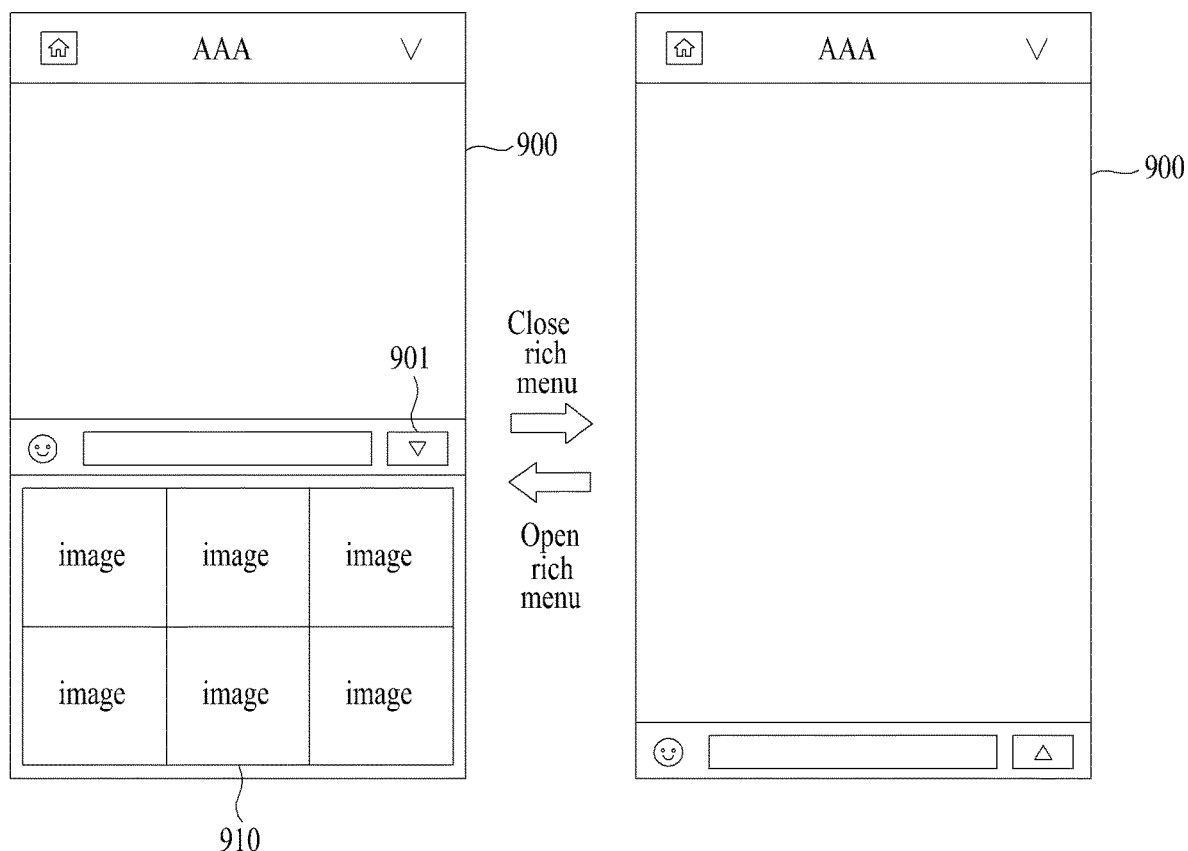

Referring to FIG. 9, if a user enters a chat room 900 with an official account "AAA", a rich menu 910 set with respect to the official account "AAA" may be displayed on the graphical user interface for the chat room 900, for example at a bottom end portion of a chat room 900 as a configurable default. Exceptionally, the rich menu 910 having a closed state may be provided with respect to a specific mode (e.g., store chat, on air mode, banner notice, and the like) of the chat room 900, and the rich menu 910 may be selectively displayed when a user calls and/or selects a menu.

The chat room 900 may include an execution button 901 on the rich menu 910. As illustrated in FIG. 9, it may be possible to open or close the rich menu 910 using the execution button 901 on the chat room 900.

Figure 10:
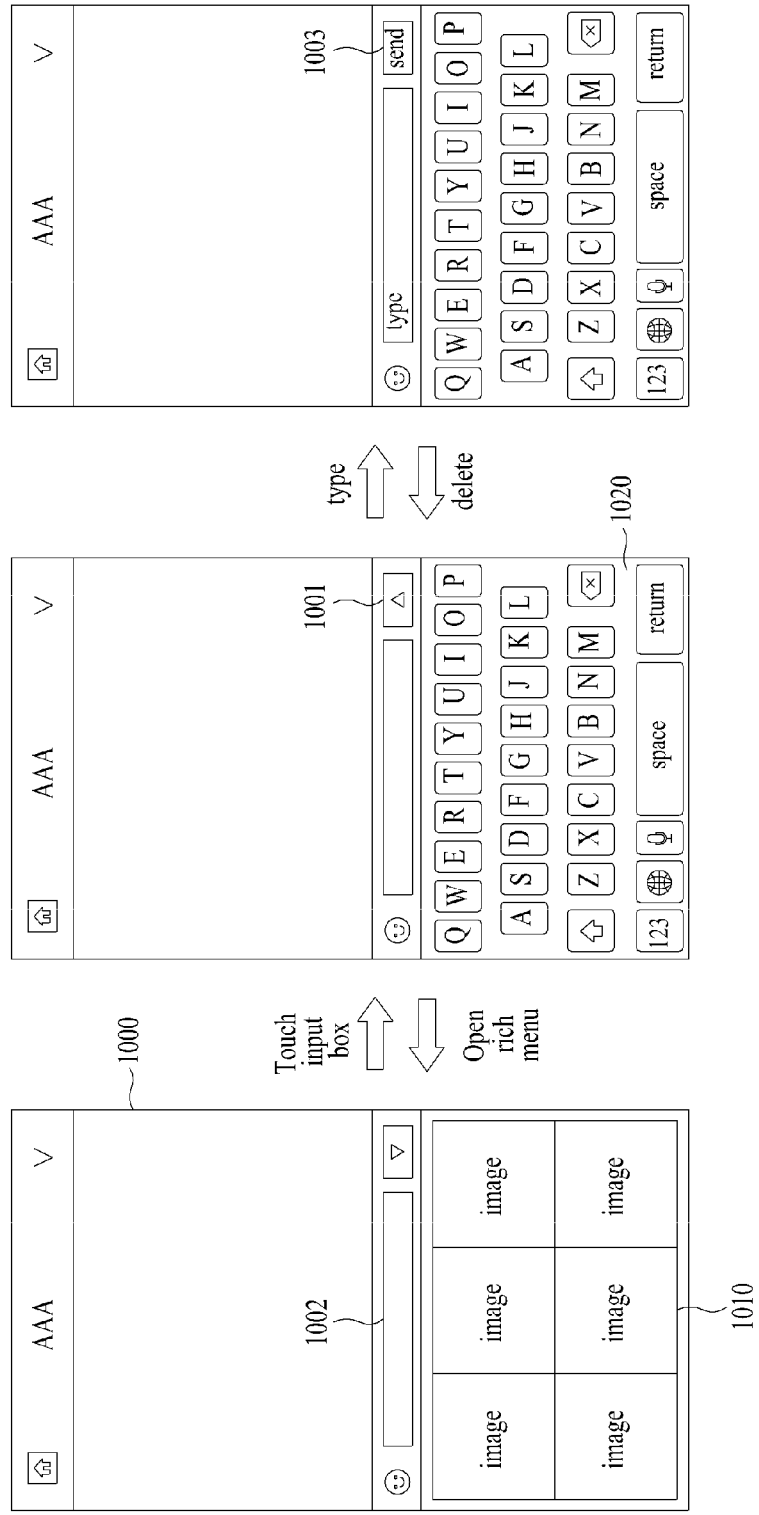

Referring to FIG. 10, a chat room 1000 may include a letter and/or character input window 1002. If the letter input window 1002 is touched at a displayed state of the rich menu 1010 or a cursor is activated in the letter input window 1002 at a displayed state of the rich menu 1010, the rich menu 1010 may disappear, and a keyboard area 1020 may be displayed at a corresponding area.

An execution button 1001 on the rich menu 1010 may be maintained before a letter or character is input at the letter input window 1002 and may be switched into a send button 1003 for sending letters from a point in time when a letter is input. The send button 1003 may be switched into the execution button 1002 if letters input at the letter input window 1002 are all deleted.

Additionally, in a mode in which other menu areas, such as a sticker, emoticon, images, sounds, etc., area provided by the chat room 1000 is selected, additional menu, sticker, emoticon, images, sounds, etc. may be displayed regardless of whether the rich menu 1010 is displayed or may be displayed in the format of intersection with the rich menu 1010, like a keyboard area 1020.

Figure 11:
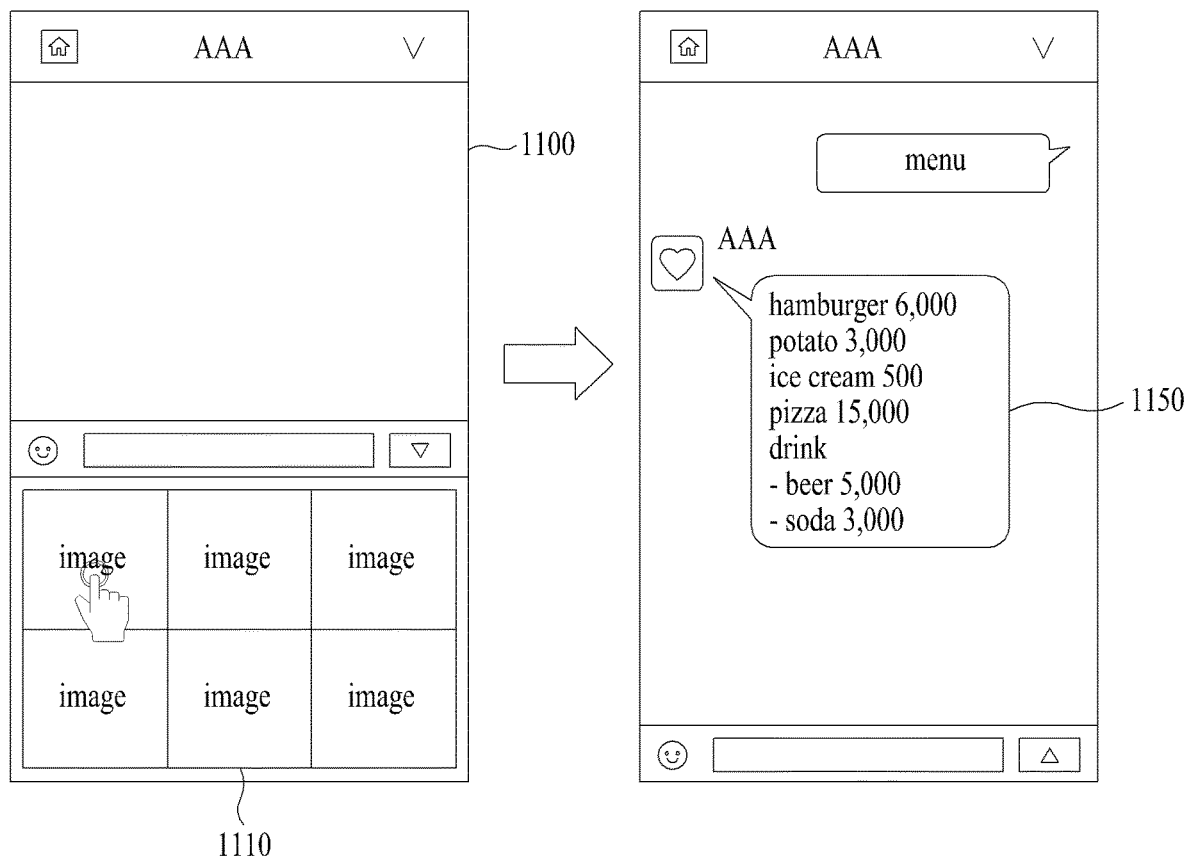
FIGS. 11 to 13 are diagrams illustrating a process for providing content associated with an official account rich menu according to some example embodiments of the inventive concepts.

Referring to FIG. 11, if a user selects one of display items included in a rich menu 1110 of a chat room 1100, content previously matched by a manager in connection with an area corresponding to a user-selected item may be transmitted to the chat room 1100.

For example, in the case where a link of an item selected by a user at the rich menu 1110 of the chat room 1100 is a keyword, as illustrated in FIG. 11, a keyword 1150 linked to the selected item may be displayed by a unit of message which is exchanged on the chat room 1100 of the official account "AAA".

Figure 12:
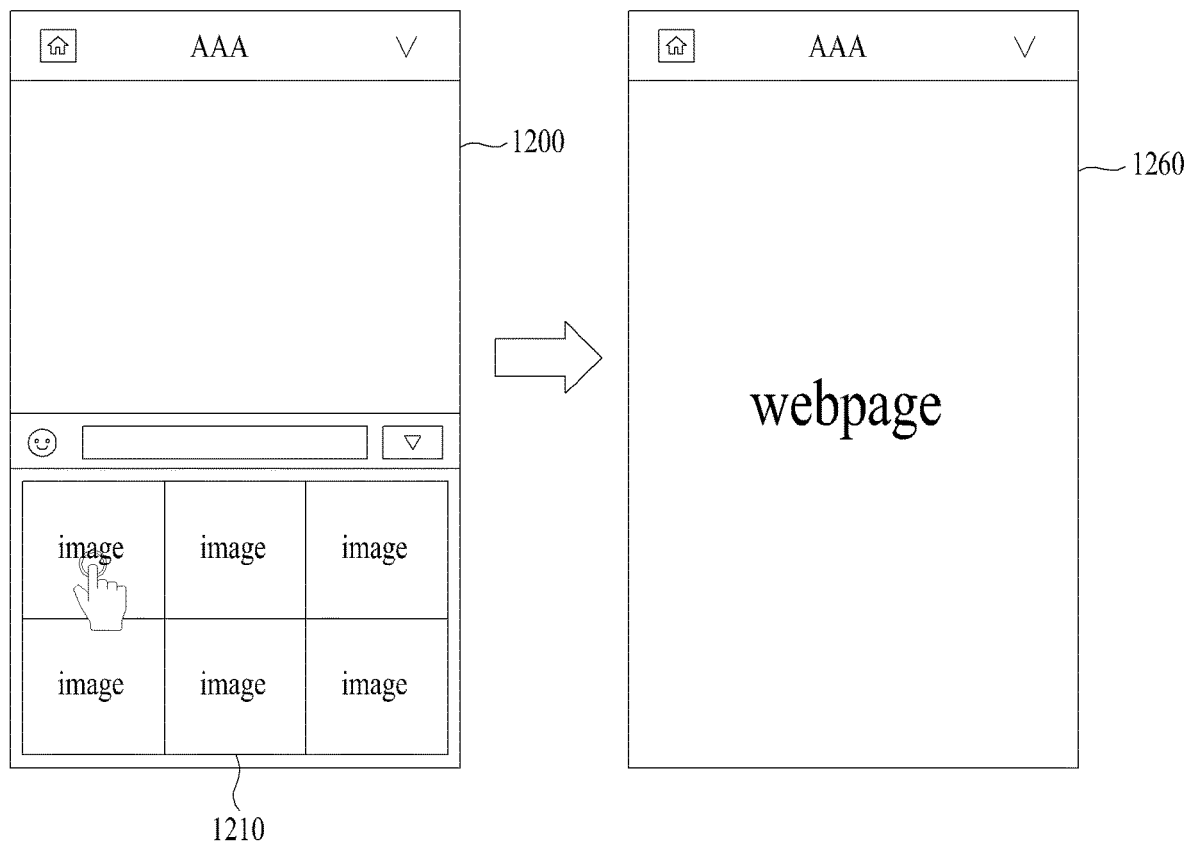

As another example, as illustrated in FIG. 12, in the case where a link of an item selected by a user at a rich menu 1210 of a chat room 1200 is an URL, a web page 1260 of a corresponding URL may be displayed while connecting to the URL linked to the selected item.

Figure 13:
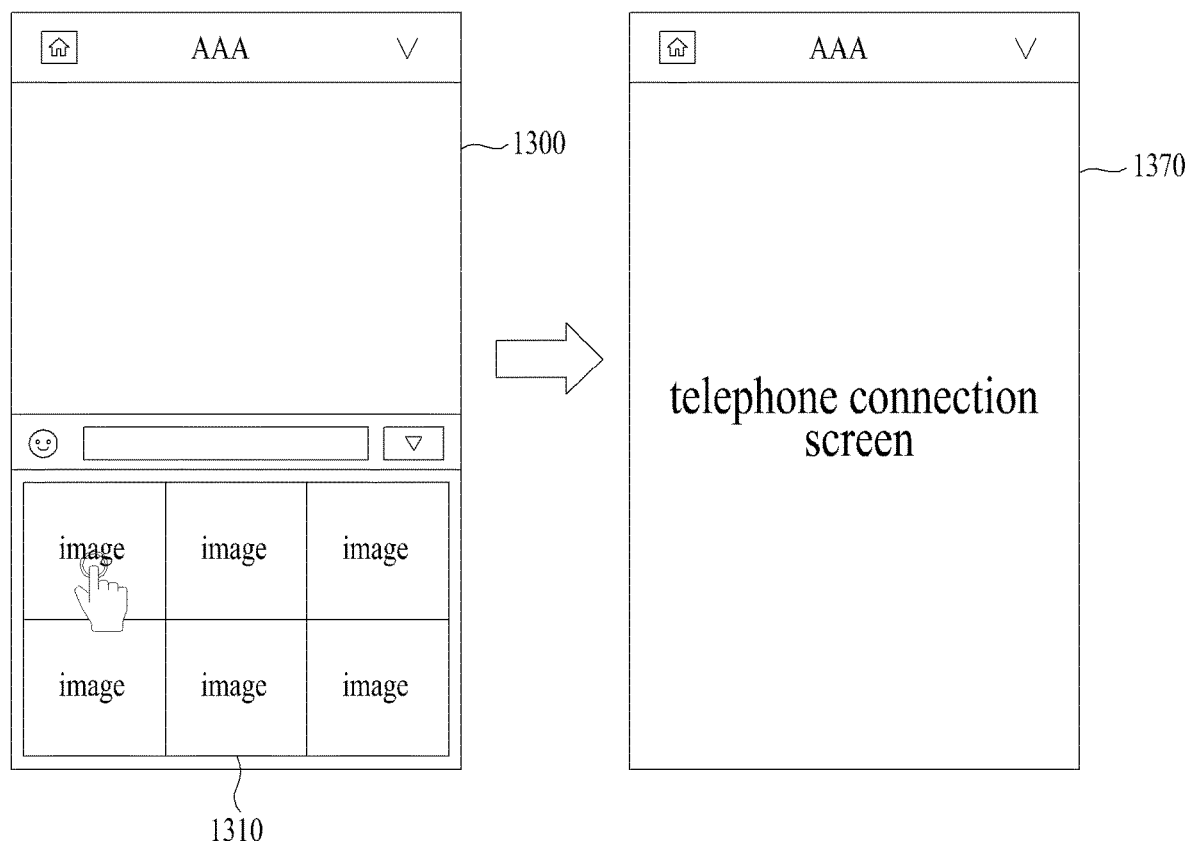

As another example, as illustrated in FIG. 13, in the case where a link of an item selected by a user at a rich menu 1310 of a chat room 1300 is a telephone number, a telephone connection screen 1370 may be displayed while dialing the telephone number linked to the selected item.

Additionally, a content providing manner may be variously changed or modified according to the following intentions or uses of an official account manager using a rich menu: multimedia reproduction, e-mail transfer, map execution, file download, and the like.

The example screens illustrated in FIGS. 4 to 13 are intended to help with the understanding of the scope and spirit of the inventive concepts, but are not limited thereto. A screen (e.g., graphical user interface) construction and/or generation, a screen order and/or graphical user interface layout, and the like may be variously changed or modified.

Figure 14:
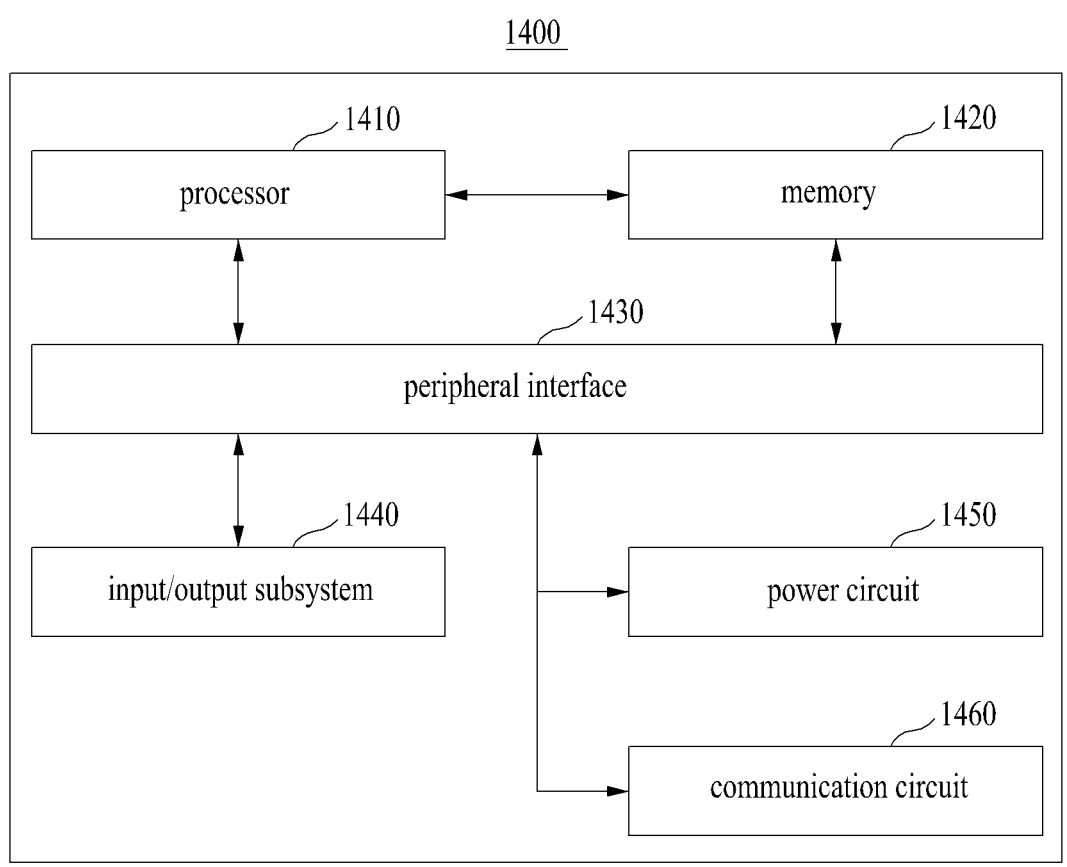
FIG. 14 is a block diagram schematically illustrating an internal configuration of a computer system according to at least one example of the inventive concepts.

FIG. 14 is a block diagram schematically illustrating an internal configuration of a computer system according to at least one example of the inventive concepts.

As illustrated in FIG. 14, a computer system 1400 may include at least one processor 1410, a memory 1420, a peripheral interface 1430, an input/output subsystem 1440, a power circuit 1450, and a communication circuit 1460. The computer system 1400 may correspond to a user terminal (or a manager terminal).

For example, the memory 1420 may include a high-speed random access memory (RAM), a magnetic disc, a static RAM, a dynamic RAM, a read only memory (ROM), a flash memory, or a nonvolatile memory. The memory 1420 may include a software module, a command set, or a variety of data necessary for an operation of the computer system. The processor 1420 may control an access to the memory 1420 from the processor 1410 or any other component (e.g., the peripheral interface 1430).

The peripheral interface 1430 may couple a peripheral input and/or output device of the computer system 1400 to the processor 1410 and the memory 1420. The processor 1410 may execute a software module or a command set stored at the memory 1420 to perform a variety of functions for the computer system 1400 and to process data.

The input/output subsystem 1440 may couple a variety of peripheral input/output devices to the peripheral interface 1430. For example, the input/output subsystem 1440 may include a controller for coupling a monitor, a keyboard, a mouse, a printer, a motion sensor controller, a microphone configured to act as a voice control device, or a peripheral device, such as a touch screen or a sensor, to the peripheral interface 1430. According to another aspect, peripheral input/output devices may be coupled to the peripheral interface 1430 without passing through the input/output subsystem 1440.

All or a part of the components of a terminal may be powered by the power circuit 1450. For example, the power circuit 1450 may include a power management system, one or more power sources such as a battery or an alternating current (AC), a charging system, a power failure detection circuit, a power converter or inverter, a power status indicator, or any other components for power generation, management, and distribution.

The communication circuit 1460 may communicate with other computer system using at least one external port. As described above, the communication circuit 1460 may include a RF circuit and may communicate with other computer system by transmitting and receiving an RF signal known as an electromagnetic signal.

The computer system 1400 depicted in FIG. 14 is provided for illustrative purposes only, and the computer system 1400 is not limited thereto. The computer system 1400 may not include some of components illustrated in FIG. 14, may further include components not illustrated in FIG. 14, or may be implemented such that two or more components are combined. For example, the computer system 1400 for a mobile terminal of a communication environment may include a touch screen, a sensor, and the like as well as components illustrated in FIG. 14, and the communication 1460 may include circuits for RF communications such as wireless-fidelity (Wi-Fi), 3G, 4G, long term evolution (LTE), Bluetooth, near field communication (NFC), Zigbee, and the like. Components capable of being included in the computer system 1400 may be implemented with hardware, including an integrated circuit specialized for one or more signal processing or an application (e.g., an ASIC), software, or a combination thereof.

Methods according to at least one example embodiment of the inventive concepts may be implemented in the format of program instructions executable through various computer systems and may be recorded at a computer-readable medium. In particular, a program according to at least one example embodiment of the inventive concepts may be a PC-based program or an application dedicated to a mobile terminal. A messenger application to which the inventive concepts are applied may be implemented in the format of in-app of a specific application or in the format of program independently operating. Furthermore, the messenger application may be installed on a user terminal (or a manager terminal) through a file which a file distribution system provides. For example, the file distribution system may include a file transfer unit (not illustrated) which transfers the file in response to a request of a user terminal (or a manager terminal).

As such, according to at least one example embodiment of the inventive concepts, a portion of a menu displayed at an official account interface may be freely used according to various intentions or uses of an official account manager, by providing a tool which allows the official account manager to input a desired label through a menu of the official account interface. According to at least one example embodiment of the inventive concepts, a new communication channel with an official account may be implemented by providing a rich menu associated with an official account to the official account interface and providing content previously set by the official account manager through the official account interface in selecting the rich menu.

Although being described with reference to specific examples and drawings, modifications, additions and substitutions on embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to at least one example embodiment of the inventive concepts, a portion of a menu displayed at an official account interface may be freely used according to various intentions or uses of an official account manager, by providing a tool which allows the official account manager inputs a desired label through a menu of the official account interface.

According to at least one example embodiment of the inventive concepts, a new communication channel with an official account may be implemented by providing a rich menu associated with an official account to the official account interface and providing content previously set by the official account manager through the official account interface in selecting the rich menu.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASIC s), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. A non-transitory computer-readable medium that stores computer readable instructions, which when executed, cause at least one processor of a user terminal to:
    transmit a request to establish a conversation interface with an official account to a server;
    receive a rich menu from the server in response to the conversation interface being established, the rich menu associated with the official account, the rich menu including at least one display item;
    display the rich menu on a portion of the conversation interface being displayed on a screen;
    receive a first user input from a user of the user terminal, the first user input causing the selective display of a keyboard area on the portion of the conversation interface, the selective display of the keyboard area replacing the display of the rich menu on the portion of the conversation interface, the keyboard area configured to receive text input on the portion of the conversation interface;
    receive a second user input from the user of the user terminal, the second user input causing the selective display of the rich menu on the portion of the conversation interface, the selective display of the rich menu replacing the display of the keyboard area on the portion of the conversation interface;
    receive a first selection of the at least one display item of the rich menu;
    identify content associated with the selected at least one display item; and
    display the identified content associated with the selected at least one display item on the conversation interface.

2. The non-transitory computer-readable medium of claim 1, wherein the displaying the identified content comprises:
    displaying a desired keyword associated with the content on the conversation interface.

3. The non-transitory computer-readable medium of claim 1, wherein the displaying the identified content comprises:
    displaying a uniform resource locator (URL) associated with the content on the conversation interface, the URL including information associated with a desired web page.

4. The non-transitory computer-readable medium of claim 1, wherein the displaying the identified content comprises:
    displaying an action code associated with the content on the conversation interface, the action code configured to call a desired program on a client.

5. The non-transitory computer-readable medium of claim 1, wherein the computer readable instructions further cause the at least one processor to:
    receive a second selection on a text input window associated with the conversation interface; and
    in response to the second selection, terminate the display of the rich menu on the portion of the conversation interface, and
    display the keyboard area the portion the conversation interface.

6. A method for displaying content implemented with a client, the method comprising:
    transmitting, using at least one processor of a user terminal, a request to establish a conversation interface with an official account to a server;
    receiving, using the at least one processor, a rich menu from the server in response to the conversation interface being established, the rich menu associated with the official account, the rich menu including at least one display item;
    displaying, using the at least one processor, the rich menu on a portion of the conversation interface being displayed on a screen;
    receiving, using the at least one processor, a first user input from a user of the user terminal, the first user input causing the selective display of a keyboard area on the portion of the conversation interface, the selective display of the keyboard area replacing the display of the rich menu on the portion of the conversation interface, the keyboard area for receiving text input on the portion of the conversation interface;
    receiving, using the at least one processor, a second user input from the user of the user terminal, the second user input causing the selective display of the rich menu on the portion of the conversation interface, the selective display of the rich menu replacing the display of the keyboard area on the portion of the conversation interface;
    receiving, using the at least one processor, a first selection on the at least one display item of the rich menu;
    identifying, using the at least one processor, content associated with the selected at least one display item; and
    displaying, using the at least one processor, the identified content associated with the selected at least one display item on the conversation interface.

7. The method of claim 6, wherein the displaying the identified content comprises:
    displaying a desired keyword associated with the content on the conversation interface.

8. The method of claim 6, wherein the displaying the identified content comprises:
    displaying a uniform resource locator (URL) associated with the content on the conversation interface, the URL including information associated with a desired web page.

9. The method of claim 6, wherein the displaying the identified content comprises:
    displaying an action code associated with the content on the conversation interface, the action code for calling a desired program on a client.

10. A client device for providing content, the client device comprising:
    at least one processor configured to execute computer readable instructions to,
        transmit a request to establish a conversation interface with an official account to a server;
        receive a rich menu from the server in response to the conversation interface being established, the rich menu associated with the official account, the rich menu including at least one display item;
        display the rich menu on a portion of the conversation interface being displayed on a screen;
        receive a first user input from a user of the client device the first user input causing the selective display of a keyboard area on the portion of the conversation interface, the selective display of the keyboard area replacing the display of the rich menu on the portion of the conversation interface, the keyboard area configured to receive text input on the portion of the conversation interface;
        receive a second user input from the user of the client device, the second user input causing the selective display of the rich menu on the portion of the conversation interface, the selective display of the rich menu replacing the display of the keyboard area on the portion of the conversation interface;
        receive a selection on the at least one display item of the rich menu;
        identify content associated with the at least one selected display item; and
        display the identified content associated with the selected at least one display item on the conversation interface.

11. The client device of claim 10, wherein the at least one processor is further configured to:
    display a desired keyword associated with the content on the conversation interface.

12. The client device of claim 10, wherein the at least one processor is further configured to:
    display a uniform resource locator (URL) associated with the content on the conversation interface, the URL including information associated with a desired web page.

13. The client device of claim 10, wherein the at least one processor is further configured to:
    display an action code associated with the content on the conversation interface, the action code configured to call a desired program on a client.

14. A non-transitory computer-readable medium that stores computer readable instructions, which when executed, cause at least one processor to:
    receive a request to establish a conversation interface with an official account from a client installed on a user terminal;
    transmit a rich menu to the client in response to the conversation interface being established, the rich menu associated with the official account, the rich menu including at least one display item;
    receive a selection from the client, the selection indicating at least one display item included in the rich menu;
    identify a content associated with the selected at least one display item; and
    transmit the identified content to the client, the identified content associated with the selected at least one display item on the conversation interface, the conversation interface is configured to receive a first user input from a user of the user terminal, the first user input causing the selective display of a keyboard area on the portion of the conversation interface, the selective display of the keyboard area replacing the display of the rich menu on the portion of the conversation interface, the keyboard area configured to receive text input on a portion of the conversation interface, and receive a second user input from the user of the user terminal, the second user input causing the selective display of the rich menu on the portion of the conversation interface, the selective display of the rich menu replacing the display of the keyboard area on the portion of the conversation interface.

15. The non-transitory computer-readable medium of claim 14, wherein the transmitting the identified content comprises:
    providing a desired keyword to the client, the desired keyword associated with the content on the conversation interface.

16. The non-transitory computer-readable medium of claim 14, wherein the transmitting the identified content comprises:
    providing a uniform resource locator (URL) to the client, the URL associated with the content on the conversation interface, the URL including information associated with a desired web page.

17. The non-transitory computer-readable medium of claim 14, wherein the transmitting the identified content comprises:
    providing an action code to the client, the action code associated with the content on the conversation interface, the action code configured to call a desired program on a client.

18. A method for providing content implemented with a server, the method comprising:
    receiving, using at least one processor, a request to establish a conversation interface with an official account from a client installed on a user terminal;
    transmitting, using the at least one processor, a rich menu to the client in response to the conversation interface being established, the rich menu associated with the official account, the rich menu including at least one display item;
    receiving, using the at least one processor, a selection from the client, the selection indicating at least one display item included in the rich menu;
    identifying, using the at least one processor, a content associated with the selected at least one display item; and
    transmitting, using the at least one processor, the identified content to the client, the identified content associated with the selected at least one display item on the conversation interface, the conversation interface being configured to receive a first user input from a user of the user terminal, the first user input causing the selective display of a keyboard area on the portion of the conversation interface, the selective display of the keyboard area replacing the display of the rich menu on the portion of the conversation interface, the keyboard area configured to receive text input on a portion of the conversation interface, and receive a second user input from the user of the user terminal, the second user input causing the selective display of the rich menu on the portion of the conversation interface, the selective display of the rich menu replacing the display of the keyboard area on the portion of the conversation interface.

19. The method of claim 18, wherein the transmitting the identified content comprises:
providing a desired keyword to the client, the desired keyword associated with the content on the conversation interface.

20. The method of claim 18, wherein the transmitting the identified content comprises:
providing a uniform resource locator (URL) to the client, the URL associated with the content on the conversation interface the URL including information associated with a desired web page.

21. The method of claim 18, wherein the transmitting the identified content comprises:
providing an action code to the client, the action code associated with the content on the conversation interface, the action code configured to call a desired program on a client.

* * * * *